3,103,415
METHOD FOR PREPARING SILANE
Harold L. Jackson, Wilmington, Del., assignor to E. I. du Pont de Nemours and Company, Wilmington, Del., a corporation of Delaware
No Drawing. Filed Aug. 1, 1957, Ser. No. 675,577
5 Claims. (Cl. 23—204)

This invention relates to silane and more particularly to a new method for its preparation.

Silane, $SiH_4$, is a very reactive compound from which almost any silicon compound can be prepared, and it is of particular interest in several specific applications. For example, silane can be pyrolyzed to silicon; added to olefins to form organosilicon compounds, which in turn can be hydrolyzed to silicones; and converted to the reactive silyl halides by reaction with hydrogen halides.

Heretofore, silane has been prepared by any of several methods such as, for example, by the action of hydrochloric acid on magnesium silicide, or by the hydrogenation of halosilanes. However, such methods generally possess certain deficiencies such as, for instance, requiring the use of expensive or relatively unavailable starting materials and special purification procedures.

Therefore, an object of this invention is to provide a novel method for preparing silane from low-cost and readily available starting materials. A further object is provision of a more economical preparation of silane suitable for use in large-scale operation. Still another object is provision of a novel method for producing silane of very high purity without requiring special purification steps.

These and other objects are accomplished in accordance with the present invention by a process which comprises contacting a compound of silicon selected from the class consisting of silica, hydrated silicas, and silicates, preferably being in a form having a high surface area, with hydrogen at a temperature between 50° and 1000° C. in the presence of an electropositive metal having an atomic number between 3 and 30, inclusive, and having a standard electrode potential of at least 0.44 volt, and in the presence of a reaction medium comprising an aluminum trihalide alone or in combination with one or more halides of elements of groups I-A, II-A and II-B of the periodic table having atomic numbers less than 80 and in which the halogens have atomic numbers between 17 and 53, inclusive, the reaction medium being inert to silane under the reaction conditions.

For best results in the process of this invention, these silicon-containing compounds should be in a finely divided form, i.e., they should have a high surface area per unit weight. Specific silicon compounds that can be used as reactants in the process of the present invention include silica gel; silicic acids and salts such as sodium metasilicate and sodium orthosilicate; silicic acid esters, e.g., ethyl silicate; sand; finely divided quartz and silicate minerals of a wide variety of types. Specific silicate minerals that are operable in the process include feldspars, e.g., orthoclase, anorthite, and albite; olivine and related minerals; micas, e.g., muscovite, vermiculite, and phlogopite; zeolites, e.g., analcite, natrolite, and heulandite; talc; diatomite; clays of various types, e.g., kaolin and bentonite; and the like.

Any electropositive metal having an atomic number between 3 and 30, inclusive, and a standard electrode potential greater than 0.44 volt can be used in the process of this invention. The standard electrode potentials referred to herein are those given on pages 340–341 of Latimer's "Oxidation Potentials," 2nd ed. (1953), Prentice-Hall, Inc. In some cases, the exact order of electrode potentials of these electropositive metals will vary when the electrode potential is determined in inorganic fused salts, and at different temperatures; however, this does not affect their operability in the process of this invention. The electropositive metals defined above include lithium, beryllium, sodium, magnesium, aluminum, calcium, chromium, manganese, iron, and zinc, which are all operable. Aluminum is the preferred electropositive metal because of its availability and high reactivity.

The particle size of the electropositive metals in the process of the present invention is not critical. However, it is preferred to use these metals in a form having a high surface area per unit weight in order to obtain more rapid reaction. Metals in the form of powder, granules, turnings, and the like, are particularly preferred.

As already indicated, any aluminum trihalide or mixture of aluminum trihalide with one or more halides of metals of groups I-A, II-A and II-B of the periodic table having atomic numbers less than 80, in which halides the halogens have atomic numbers between 17 and 53, inclusive, and which is inert to silane under the reaction conditions can be used as the reaction medium in the process of this invention. The preferred reaction media are mixtures of an aluminum trihalide with one or more alkali or alkaline earth metal halides, i.e., with one or more of the halides of metals of groups I-A and II-A.

The periodic table referred to in this specification is the table given in Deming's "General Chemistry," 5th ed. (1944), John Wiley & Sons, Inc.

The proportions of the different metal halides in the reaction medium are not critical, mixtures containing as little as 1% of the alkali or alkaline earth metal halide being operable. When low melting reaction media are desired, it is especially preferred to use a mixture of an aluminum trihalide with one or more of the halides of metals of groups I-A, II-A and II-B containing at least 50 mole percent of the aluminum trihalide. It is not necessary, however, that the reaction medium be molten under the reaction conditions employed, since silane is formed when the reaction is carried out at a temperature below the melting point of the particular metal halide reaction medium being used.

Specific metal halides and mixtures of metal halides that are useful reaction media include aluminum trichloride, aluminum tribromide, aluminum triiodide, mixtures of any of these trihalides with one or more of lithium, sodium, potassium, rubidium, cesium, calcium, magnesium, barium, zinc, and cadmium chlorides, bromides or iodides.

As indicated previously, the process of this invention can be carried out at temperatures between 50° and 1000° C. Preferably, the reaction is carried out at a temperature between 130° and 400° C. It will be understood that the particular temperature used in any individual case is selected with regard to the specific reaction medium and operating pressure being employed.

The pressure at which the process of this invention is carried out is not critical, pressures ranging from subatmospheric to superatmospheric being satisfactory. It is preferred when carrying out the reaction at the lower temperatures described above to employ a reaction pressure between 100 and 1000 atmospheres.

The reaction time required for preparing silane by the process of this invention is likewise not critical. Reaction times ranging from a few seconds, for example, 5–10 seconds, up to several hours, and longer, e.g., 24 hours, can be used. The exact time in any instance depends on the particular operating temperature being employed. At temperatures between 100 and 400° C., reaction times up to 24 hours are satisfactory. However, when higher temperatures are used it is preferred that shorter reaction times, e.g., 5–10 seconds, or less, be employed since silane decomposes slowly at about 400° C. and rapidly above 800° C.

The proportions of reactants used in the process of this invention are not critical. However, an excess of hydrogen and an excess of electropositive metal, based on the amount of silicon compound employed, is preferred. The excess of hydrogen and electropositive metal can range up to 100% or more based on the weight of the silicon compound.

The process of this invention is conveniently carried out in a corrosion-resistant reaction vessel capable of withstanding superatmospheric pressure. Preferably, the reaction vessel is capable of being agitated, or means are provided for stirring the reaction mixture, although this is not essential. The reactor is charged with the silicon compound, the electropositive metal, and the reaction medium. Preferably, the reaction vessel is purged with an inert gas such as, for example, helium before being charged with the reactants and the reaction medium. If the reactor is to be agitated, it is often convenient to include in the reaction vessel a mixing aid, e.g., stainless steel balls, in order to provide more efficient mixing during the reaction.

Hydrogen is then introduced into the reaction vessel to provide the desired operating pressure at the temperature selected for the reaction and the vessel is heated to that temperature. Additional hydrogen can be introduced periodically to maintain the pressure at the desired value. However, this is not essential if an excess of hydrogen has been introduced at the start of the reaction. After the reaction is completed, which may be indicated by the cessation of the absorption of hydrogen, the reaction vessel is cooled. If the reactor has been agitated during the reaction period, it is desirable to inject hydrogen during the cooling step to remove any solid materials that might be plugging the outlet.

After the reactor is cooled, volatile reaction products are carefully bled through traps cooled to a low temperature by means of liquid nitrogen or other means, to isolate silane. Unreacted hydrogen passes through the liquid nitrogen-cooled trap.

The process of this invention can also be carried out in a continuous flow system in which the silicon compound, the electropositive metal, and the reaction medium are passed through a reaction zone heated to the desired temperature and under the desired pressure of hydrogen. This type of process is particularly advantageous for use when temperatures in the upper portion of the operable range are employed, e.g., at 400–1000° C., since the silane produced can be removed from the reaction zone rapidly and thus minimize its decomposition.

Still other methods of carrying out the process of this invention involve passing hydrogen through a static melt consisting of a molten metal halide reaction medium containing the electropositive metal and the silicon compound, or passing hydrogen through a bed of finely divided solid metal halide reaction medium, electropositive metal and silicon compound. In these embodiments additional silicon compound is added periodically during the reaction.

The reactants used in the process of this invention can be of the ordinary grades of materials available commercially. The hydrogen should be oxygen-free.

The following examples are intended for the purpose of illustrating the invention. It will be appreciated that examples are not intended to limit the invention, since the invention is susceptible to modification without departure from the letter and spirit of the appended claims.

*Example I*

A stainless steel-lined pressure vessel of 400 ml. capacity, which has been purged with helium, is charged with 20 g. of silica gel (28–200 mesh, and containing 43.9% silicon), 20 g. of aluminum powder (80–100 mesh), 113 g. of anhydrous aluminum chloride, 30 g. of sodium chloride, and 30 stainless steel balls of ⅜″ diameter. Hydrogen is introduced to a pressure of 390 atmospheres at room temperature and the reaction vessel is heated to 130° C. More hydrogen is introduced to bring the pressure to 800 atmospheres. The reaction vessel is agitated and maintained at 130° C. and 750–800 atmospheres pressure for 8 hours. The reaction vessel and its contents are cooled to room temperature and the volatile materials are bled into a trap cooled by liquid nitrogen. The material which condenses in the liquid nitrogen trap amounts to 1.2 g. Mass spectrographic analysis of this condensate indicates that it contains greater than 99.5% silane, $SiH_4$.

*Example II*

Using the procedure described in Example I, a pressure vessel is charged with 20 g. of finely divided silica (44.67% silicon), 30 g. of aluminum powder (80–100 mesh), 113 g. of anhydrous aluminum chloride, 30 g. of sodium chloride, and 30 stainless steel balls. The silica used in this example is obtained by igniting a sample of organophilic fine silica (an estersil for the type described in U.S. Patent 2,657,149), until all of the carbonaceous material is removed. The reaction vessel is heated to 250° C. and a hydrogen pressure of 840–850 atmospheres is maintained for 6 hours. The volatile reaction product that condenses in the cold trap amounts to 2.0 g. of silane.

*Example III*

Following the procedure set forth in Example I, a pressure vessel is charged with 20 g. of Ottawa sand (46.65% silicon), 30 g. of aluminum powder (20–80 mesh), 113 g. of anhydrous aluminum chloride, 30 g. of sodium chloride, and 30 stainless steel balls. The mixture is pressured with hydrogen, and agitated for 16.5 hours at 250° C. at a hydrogen pressure of 900–910 atmospheres. Analysis of the volatile reaction product condensed in the cold trap by the mass spectrograph shows the presence of silane.

*Example IV*

Using the procedure described in Example I, a pressure vessel which has been purged with nitrogen is charged with 30 g. of sodium silicate (dry, insoluble powder containing 34.85% silicon), 30 g. of aluminum powder (80–100 mesh), 113 g. of anhydrous aluminum chloride 30 g. of sodium chloride, and 30 stainless steel balls. The reaction mixture is pressured with hydrogen and agitated for 8 hours at 250° C. at a hydrogen pressure of 900 atmospheres. The volatile product condensed in the liquid nitrogen trap is shown by mass spectrographic analysis to contain greater than 99% silane.

*Example V*

In accordance with the procedure of Example I, a mixture of 35 g. of bentonite clay (26.33% silicon), 30 g. of aluminum powder, 113 g. of anhydrous aluminum chloride, and 30 g. of sodium chloride hydrogenated at 250° C. under a pressure of 800–810 atmospheres for 8 hours gives 1.8 g. of silane. Mass spectrographic analysis indicates that this silane is at least 99% pure.

Example VI

Following the procedure of Example I a pressure vessel which has been flushed with nitrogen is charged with 25 g. of powdered diatomite of the type commonly used as a filter aid, 25 g. of aluminum powder, 113 g. of anhydrous aluminum chloride, 30 g. of sodium chloride, and 30 stainless steel balls. The vessel is pressured with hydrogen and agitated at 200° C. for 8 hours at a hydrogen pressure of 750 atmospheres. The volatile reaction product obtained in the cold trap amounts to 4.4 g. of silane.

Example VII

Using the procedure described in Example I, a pressure vessel which has been flushed with nitrogen is charged with 20 g. of silica gel (28–200 mesh, containing 43.9% silicon), 20 g. of aluminum powder (20–80 mesh), 113 g. of anhydrous aluminum chloride, 30 g. of sodium chloride, and 30 stainless steel balls. The mixture is pressured with hydrogen and agitated at 200–204° C. for 8 hours at a hydrogen pressure of 400–475 atmospheres. The volatile reaction product obtained in the cold trap amounts to 6.2 g. of silane (61.5% of theoretical).

Example VIII

Using the procedure of Example I, a pressure vessel which has been flushed with nitrogen is charged with 10 g. of silica gel (28–200 mesh, containing 43.9% silicon), 62.2 g. of calcium granules (4–80 mesh), 113 g. of anhydrous aluminum chloride, 30 g. of sodium chloride, and 30 stainless steel balls. The mixture is pressured with hydrogen and agitated at 200° C. for 8 hours at a hydrogen pressure of 750 atmospheres. The volatile reaction product that condenses in the cold trap amounts to 0.5 g. of silane.

Example IX

Following the procedure as outlined in Example I, a pressure vessel which has been flushed with helium is charged with 20 g. of silica gel (28–200 mesh, containing 43.9% silicon), 15.6 g. of lithium wire, 113 g. of anhydrous aluminum chloride, 30 g. of sodium chloride, and 30 stainless steel balls. The mixture is pressured with hydrogen and agitated at 200° C. for 8 hours at a hydrogen pressure of 750 atmospheres. The volatile reaction product that condenses in the cold trap amounts to 0.7 g. of silane.

Example X

Using the procedure of Example I, a pressure vessel which has been flushed with nitrogen is charged with 20 g. silica gel (28–200 mesh, containing 43.9% silicon), 72.2 g. of zinc (80–120 mesh), 113 g. of anhydrous aluminum chloride, 30 g. of sodium chloride, and 30 stainless steel balls. The mixture is pressured with hydrogen and agitated at 200° C., for 8 hours at a hydrogen pressure of 750–800 atmospheres. The volatile reaction product that condenses in the cold trap amounts to 2.3 g. of silane.

Example XI

Following the procedure set forth in Example I, a pressure vessel which has been purged with helium is charged with 62.5 g. of tetraethyl orthosilicate, 20 g. of aluminum powder (20–80 mesh), 113 g. of anhydrous aluminum trichloride, 30 g. of sodium chloride, and 30 stainless steel balls. The vessel is pressured with hydrogen and heated at 195–200° C. under a hydrogen pressure of 700–770 atmospheres for 7 hours. There is obtained 25 g. of volatile reaction product condensed in the liquid nitrogen trap. Mass spectographic analysis shows that this material contains 4.5–5% silane with the remainder being ethane.

Example XII

Using the procedure of Example I, a pressure vessel which has been purged with helium is charged with 20 g. of silica gel (containing 43.9% silicon), 20 g. of aluminum powder (20–80 mesh), 104 g. of anhydrous aluminum trichloride, 13 g. of sodium chloride, 13 g. of potassium chloride, and 30 stainless steel balls. The reaction mixture is heated at 200° C. for a few minutes in order to melt the metal halide reaction medium and is then cooled to 100° C. Hydrogen is added and the mixture is heated at 99–103° C. for 14 hours at a hydrogen pressure of 750–800 atmospheres. The volatile reaction product that condenses in the liquid nitrogen trap is silane and amounts to about 0.1 g.

Example XIII

Following the procedure of Example I, a reaction vessel is charged, after purging with helium, with 20 g. of silica gel (43.9% silicon), 20 g. of aluminum powder (20–80 mesh), 1.1 g. of anhydrous aluminum trichloride, 0.3 g. of sodium chloride, and 30 stainless steel balls. After heating at 200° C. for 15 hours at 750 atmospheres hydrogen pressure, there is isolated in the liquid nitrogen trap 0.7 g. of silane (corresponding to a 7% yield).

Example XIV

This example illustrates the preparation of silane in the presence of a solid reaction medium. Following the procedure set out in Example I, a pressure vessel which has been purged with helium is charged with 20 g. of silica gel (containing 43.9% silicon), 20 g. of aluminum powder (20–80 mesh), 113 g. of anhydrous aluminum trichloride, and 30 stainless steel balls. The reaction mixture is heated at 175° C. (which is below the melting point of aluminum trichloride) under 750 atmospheres of hydrogen pressure for 15 hours. The product condensed in the liquid nitrogen trap amounts to 6.1 g., corresponding to a 60% yield, and is silane of at least 98% purity.

The embodiments of the invention in which an exclusive property or privilege is claimed are defined as follows:

1. A method for preparing silane which comprises reacting a compound of silicon selected from the class consisting of silica, hydrated silicas, and silicates with hydrogen at a temperature of from 50° to 1000° C. in the presence of an electropositive metal having an atomic number between 3 and 30, inclusive, and a standard electrode potential of at least 0.44 volt, and in the presence of a reaction medium inert to silane under reaction conditions, said reaction medium comprising an aluminum trihalide wherein the halogens of the trihalide are of atomic numbers between 17 and 53, inclusive.

2. Process of claim 1 wherein the silicon compound is in a form having a high surface area.

3. Process of claim 1 wherein the electropositive metal is aluminum.

4. Process of claim 1 wherein the reaction medium inert to silane under reaction conditions is composed of an aluminum trihalide and at least one halide of an element of the class consisting of groups I–A, II–A and II–B of the periodic table, said element having an atomic number less than 80, the halogens in said halides having atomic numbers between 17 and 53, inclusive.

5. A method for preparing silane which comprises contacting a finely divided, silicon-containing compound selected from the class consisting of silica, hydrated silicas and silicates bonds with hydrogen at a temperature within the range of 130 and 400° C. in the presence of an electropositive metal having an atomic number between 3 and 30, inclusive, and a standard electrode potential of at least 0.44 volt, and in the presence of a reaction medium inert to silane under reaction conditions, said reaction medium comprising an aluminum trihalide wherein the halogens of the trihalide are of atomic numbers between 17 and 53, inclusive.

(References on following page)

References Cited in the file of this patent

UNITED STATES PATENTS

| | | |
|---|---|---|
| 648,463 | Knaur et al. | May 1, 1900 |
| 2,406,605 | Hurd | Aug. 27, 1946 |
| 2,469,879 | Hurd | May 10, 1949 |
| 2,888,327 | Adams | May 26, 1959 |

OTHER REFERENCES

"Chemical and Metallurgical Engineering," volume 50, No. 11, page 193 (November 1943).

Hurd: "Chemistry of the Hydrides," 1952, pages 64 and 65.

Hurd: "Journal of The American Chemical Society," vol. 71, pages 20–22 (1949).

A. Stock: "Hydrides of Boron and Silicon," Cornell University Press, Ithaca, N.Y., page 29, 1933.

W. Eitel: "The Physical Chemistry of the Silicates," The University of Chicago Press, Chicago, Ill., page 203.

UNITED STATES PATENT OFFICE
CERTIFICATE OF CORRECTION

Patent No. 3,103,415            September 10, 1963

Harold L. Jackson

It is hereby certified that error appears in the above numbered patent requiring correction and that the said Letters Patent should read as corrected below.

Column 3, line 53, for "bleed" read -- bled --; column 6, line 65, strike out "bonds".

Signed and sealed this 31st day of March 1964.

(SEAL)
Attest:
ERNEST W. SWIDER

Attesting Officer

EDWARD J. BRENNER

Commissioner of Patents